Jan. 11, 1966   C. J. WAECHTER ET AL   3,229,007
METHOD FOR BLOW MOLDING OF HOLLOW ARTICLES
Filed Aug. 2, 1962   2 Sheets-Sheet 1

INVENTORS
CHARLES J. WAECHTER &
LLOYD KOVACS
BY Thomas S. Meyner
ATTORNEY

Jan. 11, 1966  C. J. WAECHTER ET AL  3,229,007
METHOD FOR BLOW MOLDING OF HOLLOW ARTICLES
Filed Aug. 2, 1962  2 Sheets-Sheet 2

INVENTORS
CHARLES J. WAECHTER &
LLOYD KOVACS
BY *Thomas A. Maynier*
ATTORNEY

United States Patent Office 3,229,007
Patented Jan. 11, 1966

3,229,007
METHOD FOR BLOW MOLDING OF HOLLOW ARTICLES
Charles J. Waechter, New Market, and Lloyd Kovacs, Somerset, N.J., assignors to Midland-Ross Corporation, Cleveland, Ohio, a corporation of Ohio
Filed Aug. 2, 1962, Ser. No. 214,269
3 Claims. (Cl. 264—99)

This invention relates to a method of manufacture of hollow articles from thermoplastic materials by an extrusion and blowing process and, more particularly, to the making of various shaped hollow articles having substantially uniform thick walls.

The principle of extrusion blow molding process is one of extruding a predetermined parsion length of a thermoplastic material, placing it into a split mold, then inflating it to the internal contour of the mold by air pressure introduced to the interior through an air mandrel either concentric with the extrudate, or by a probe introduced through the wall of such extrudate at a convenient point in the part. The molded article is then cooled, the mold opened and the molded part ejected.

In blow molding of other than circular and cylindrical hollow articles or where the shape or contour varies along the longitudinal axis, walls of uniform thickness have been difficult to form. There are methods where a tube or a parison with additional quantities of thermoplastic material in areas of greater diameter than those of normal or narrower portions is extruded or ejected but these do not provide for best possible distribution or for any graduation in thickness where the contour changes so as to form a uniformly thick wall despite their irregular form. The parison shape then should preclude that of the final article and provide for sufficiency of material for proper and gradual distribution upon expansion or restriction of the particular parison section, to yield a final desired shape with a proper wall thickness throughout. Since the amount of thermoplastic material extruded is generally constant, it is necessary then that the material be spread along the parison length for desired distribution when blown to give proper wall thicknesses.

In the extrusion of a parison tube, the rate of ejection through any given die orifice affects the total weight. While the quantity or amount of plastic material extruded is generally constant, fast ejection produces a heavier weight in certain parison areas, slow ejection a lighter weight. By controlling the movement of the ejector or ram so as to vary its rate, the given amount of material is distributed over an entire length of the parison anticipating increased wall thickness requirements for greater diameter areas and vice versa. An ejected parison would thus be preformed with thickened and thinned walls which, upon expansion by air blown into the mold, would yield a final, circular, cylindrical or noncylindrical article having a desired uniform wall thickness.

Thermoplastic materials are compressible to an extent and this characteristic is advantageously utilized along with variable ram travel during extrusion of parisons anticipating a particular final shape of a molded article, whether of varying diameter or of rectangular form or of both. In the extrusion of a parison tube, the rate of ejection through any given die or orifice affects the total weight, faster ejection produces a heavier weight than a slower one. Then, by controlling the movement of the ejector or ram which is under constant pressure so as to alter or change its rate of movement and thus the pressure on the thermoplastic, the output amount of material can be varied along a parison length. The ejected parison of thickened and thinned walls is then expanded by air blown into the closed mold yielding a final, desired, circular, noncylindrical, or rectangular or other shaped hollow article having desired substantially uniform wall thickness. Thus, the method of this invention will produce an anticipating parison not only of even diameter and wall thickness irrespective of length but of variable wall thickness in variable diameters utilizable for blowing rectangular or square sectioned hollow articles as well as circular and cylindrical.

The control of the parison shape or form anticipating a blown article, as stated, is effected through control of an ejector ram acting on thermoplastic material. Regulated extrusion and return of the ram will provide parisons designed to give desired wall thickness in rectangular or cylindrical or circular noncylindrical forms of molded articles. The control is effected by means of a cam anticipating a parison form by governing the rate of ejection and of material distribution in the parison. More specifically, the applicant controls the movement of an ejecting ram piston and its return by means of the said cam and a regulated pressure return of the ram. The cam is connected directly to the ram and, through a sensing means, controls the flow of outlet oil while maintaining constant the oil pressure acting on the piston of the ram. A parallel by-pass control of pressure fluid further alters the rate of plastic flow and thus the extruded weight while keeping its parison form. This method is more specifically shown and described in the attached drawing and the following specification, where:

Figure 1:
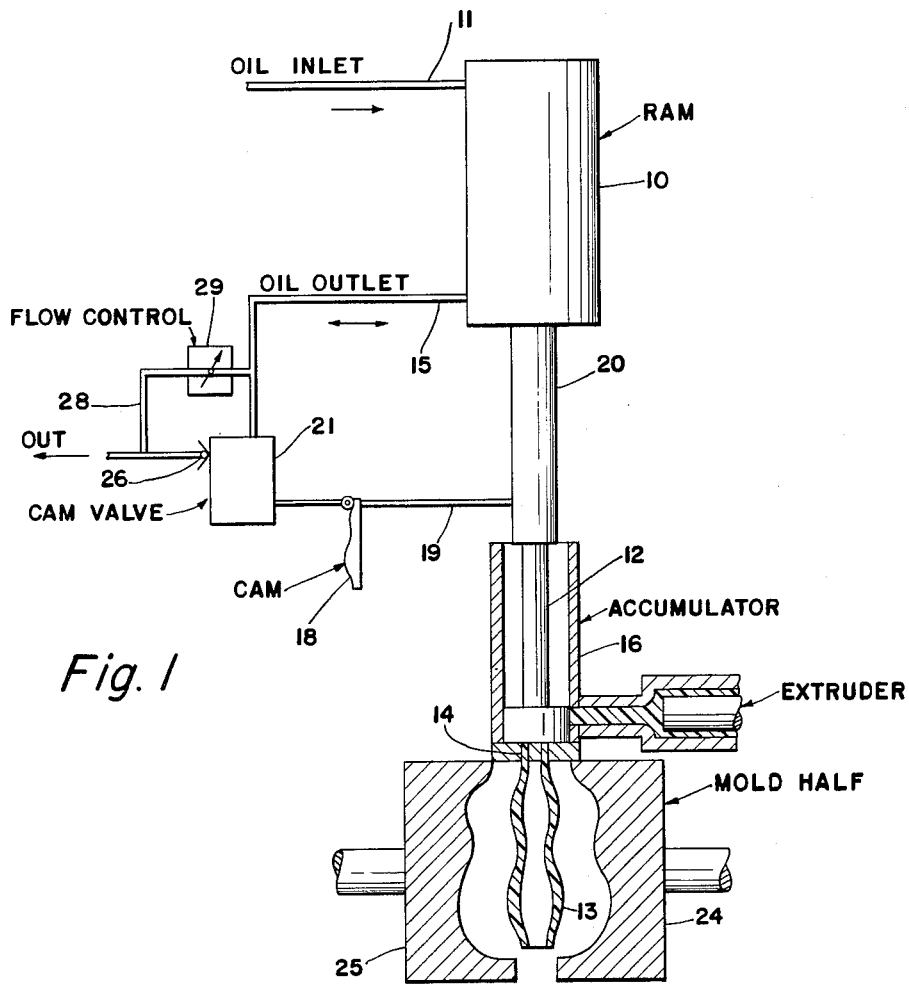
FIGURE 1 is a diagrammatic representation of only such portions of a blow molding apparatus required to describe the invention including the cam control means.

It is known that the thickness of a parison wall can be controlled to an extent by varying the amount of a thermoplastic substance forced through a die, as by changing the rate of movement of an extruding piston or cylinder or ram. Advantageously, then, it would be desirable to control the travel rate of the ram or piston in accordance with quantity requirements and distribution giving the shape or form and weight of the final article, the articles being represented by an anticipating contour of a cam connected to the ram and having a configuration which when blown will give the desired form of the molded article. The parison shape as well as its length can thus be controlled by controlling the movement of the ram throughout its travel between the terminal points determined by the limit power cut-offs. The extruded variation in parison thickness along its length, and weight, is attainable by a variation in pressure, as by a suddenly faster rate of travel of the ram piston and pressure changes of this nature can be done several times during the formation of a parison.

In ram accumulators, the melt is always in a plastic condition so that it can be repetitively and quickly ejected to give a parison of a given desired weight and length in the matter of a few seconds. Through the use of a contour cam, which controls a sensitive valve controller or flow regulator of pressure fluid directly controlling the amount of out-flowing oil while constant the oil pressure is acting on the ram piston, the travel of the ram ejector can readily be altered in that short period of time. For further greater flexibility, such as in controlling weight of an ejected parison, there is provided an additional fluid control to act in parallel for predeterminedly by-passing some of the pressure fluid around the cam control to, therethrough, while maintaining the parison shape, yet eject a different weight of thermoplast by a quicker ejection.

As shown in the drawing, the ram ejector 10, diagrammatically and generally disclosed as being part of a partially disclosed blow molding machine, is hydraulically operable. Its piston is subjected to a constant inlet oil pressure through the incoming conduit 11. The pressure fluid acts on the piston of the ram forcing it downwardly. On its downward stroke, the ram 10 forces a piston 12 positioned in the plastic accumulator 16 (shown in partial section) to eject a thermoplast 13 through a circular die 14 to form a parison of a certain shape. The thermoplast or parison 13 is of a given weight and length to be accommodated by a split mold 24, 25. During extrusion, the melt is ejected from the accumulator 16 over a predetermined certain time cycle measured in seconds. The piston's downward travel rate is regulated by the constant pressure of oil on its top and adapted to be altered by a proportional resistance of oil in its outlet side flowing through conduit 15, the flow being controlled by the cam 18 connected through arm 19 to the ram connecting rod 20. The cam 18 anticipates thus the parison 13 shape.

Figure 1A:
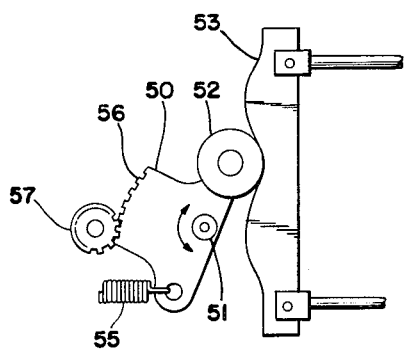
FIGURE 1A is one form cam follower control for the blow molding ram ejection of FIGURE 1.
Figure 2:
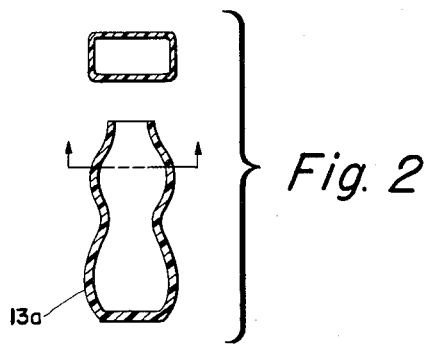
FIGURES 2, 3 and 4 are diagrammatic representations of variations of contour cams for different parisons, and the final molded products in related forms.

More specifically, oil pressure resistance on the outflow side of the ram 10 is varied through the operation of a regulator valve 21 that is operable by the sensing cam follower arm 22 riding the cam. The regulator valve 21, advantageously, is one that is pressure and temperature compensated and one that is commercially available and ordinarily used to regulate oil flow, when positioned in an oil line. The amount of oil flowing through the controller 21, in this instance, is dictated by the deflective movement (rotational) of the follower arm 22 riding the form of the cam 18. The movement of the follower is translated to directly operate a rotating valve (only generally shown) governing the flow of pressure oil therethrough to a collecting well. One type of such a control unit is shown in FIGURE 1A. A base support 50 is pivoted at 51 and it carries a roller wheel 52 at one end which follows the contour of a cam 53, the roller wheel being maintained in contact with the cam surface by a tension spring 55 attached to the opposite base end. The base 50 has an arcuate toothed rearward extension 56 that actuates through intermeshing teeth a rotatable valve 57 positioned in the oil outflow line.

As mentioned herein, the weight of the formed parison tube can be desirably manually altered within limits even if the extruding die and the pressure source are fixed. Ordinarily, such circumstances would call for a change in dies. Where larger dies are used, a change is hardly practical. With the addition of the by-pass flow control 29, the ram resisting outflow pressure fluid can be subdivided between that controlled by the cam and that by-passed. By changing this ratio, the rate of ram extrusion is changed varying the weight of the extruded parison. The weight, then, of a parison can be changed by adjusting the by-pass flow control valve 29.

Once the ejector cylinder 12 has reached its lowermost position, the mold halves 24, 25 close upon the parison 13, and air under pressure is forced into the parison expanding it to the shape predetermined by the closed mold halves. The ejector piston 12 is then returned to its upper position in the accumulator 16 which is then automatically immediately refilled but only upon the regulated withdrawal of the ejector piston 14 for the next downward stroke. The ram 10 is returned to its upper limit through a reversal flow of oil in conduit 15, flowing into the base of the ram chamber 10 through by-pass 28, positioned around the cam operated regulator valve 21.

A one-way valve 26 prevents oil from reversely flowing through regulator valve 21, and the flow controller 29 regulates the flow through the by-pass 28 into outlet conduit 15 during extrusion periods. Oil under reverse but at a controlled pressure passes around the regulator valve 21 through flow controller valve 29, which can be desirably manually altered, to the under side of the ram 10 raising it at predetermined rates to its restart position. This retraction under pressure assures an elimination of voids and a compact and full refilling of the accumulator.

Figure 3:
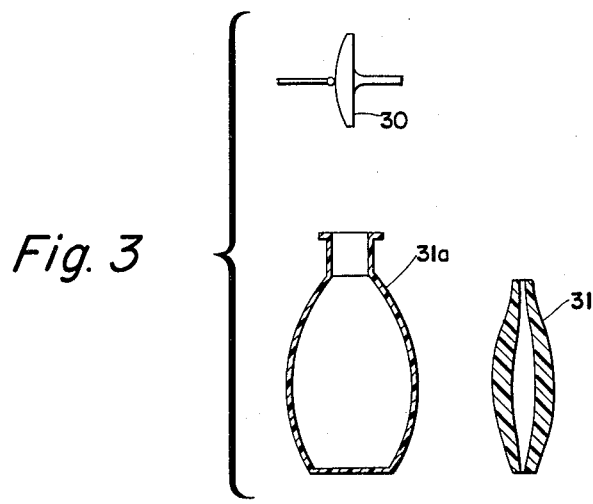
Figure 4:
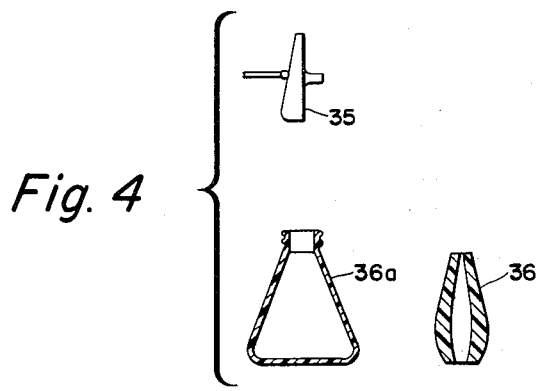

Under most conditions, the ejection of a parison takes but a few seconds so there is practically no deformation of its shape because of its weight other than that intended. Where a longer or heavier parison is extruded and the tendency of the thermoplast is to elongate and thin out, the cam can offset such tendency by increasing the flow of the material through faster ram travel over the critical distance. As stated herein, the shape of cam 18 yields the form of parison 13 which when blown while in the mold 24, 25 produces the final form 13a, a section varying noncylindrical shell or container having generally uniform thick walls. Or, the cam shape can take the form of cam 30 in FIGURE 3 which will yield a parison 31 and, when blown, an article 31a; or, as shown in FIGURE 4, cam 35 will produce a parison 36 which, when blown, takes the final form 36a determined by a mold with uniformly thick walls throughout. These can be circular or otherwise in sectional form.

What is claimed is:

1. The method of preforming a parison to anticipate the shape and desired wall thickness of a blown plastic article comprising automatically continuously regulating the applied pressure of a fluid controlling the rate of extrusion of an expansible heated plastic material through a fixed annular opening, maintaining the applied pressure constant, resisting the applied pressure automatically continuously variably in accordance with the shape of a desired formed parison.

2. The method of preforming a parison to anticipate the shape and desired wall thickness of a blown plastic article comprising maintaining a constant applied extrusion pressure on an expansible heated plastic material through a fixed annular opening, and continuously varying the extrusion rate by resisting the applied pressure variably in accordance with the shape of a desired parison and further adjusting the resistance pressure by by-passing a constant portion of the variable resistance.

3. The method of forming a parison of expansible heated plastic material having a substantially constant diameter and uniformly thick walls comprising, extruding a predetermined quantity of the material through a fixed annular opening at a pressure that is automatically continuously compensated for the elongation tendency of the plastic material being extruded.

References Cited by the Examiner
UNITED STATES PATENTS

| 2,632,202 | 3/1953 | Haines | 18—5 |
| 2,804,654 | 9/1957 | Sherman | 18—55 |
| 2,871,516 | 2/1959 | Sherman et al. | 18—30 |
| 2,887,716 | 5/1959 | Crosio | 18—5 |
| 3,000,051 | 9/1961 | Schaich | 18—55 |

ROBERT F. WHITE, *Primary Examiner.*

MORRIS LIEBMAN, ALEXANDER H. BRODMERKEL, *Examiners.*

M. H. ROSEN, *Assistant Examiner.*